United States Patent
Gerstenberg et al.

(10) Patent No.: US 9,381,818 B2
(45) Date of Patent: Jul. 5, 2016

(54) NON-TRACK-BOUND VEHICLE

(71) Applicant: SIEMENS AKTIENGESELLSCHAFT, Munich (DE)

(72) Inventors: Frank Gerstenberg, Berlin (DE); Goeran Keil, Schoenefeld (DE); Michael Lehmann, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 244 days.

(21) Appl. No.: 13/872,674

(22) Filed: Aug. 5, 2013

(65) Prior Publication Data
US 2015/0165911 A1 Jun. 18, 2015

(30) Foreign Application Priority Data
Sep. 28, 2012 (DE) .......................... 10 2012 217 773

(51) Int. Cl.
*B60L 5/00* (2006.01)
*B60L 5/16* (2006.01)
*B60L 9/00* (2006.01)

(52) U.S. Cl.
CPC ... *B60L 5/16* (2013.01); *B60L 9/00* (2013.01); *B60L 2200/30* (2013.01)

(58) Field of Classification Search
CPC ............... B60L 5/16; B60L 5/34; B60L 5/36; B60L 5/38; B60L 5/40; B60L 5/42; B60L 5/20; B60L 5/22; B60L 5/24; B60L 5/12; B60L 5/14; B60L 9/00
See application file for complete search history.

(56) References Cited

U.S. PATENT DOCUMENTS

| 2,324,761 | A | * | 7/1943 | Budner | 191/85 |
| 4,357,501 | A | * | 11/1982 | Clerc | 191/83 |
| 4,634,817 | A | * | 1/1987 | Griffiths et al. | 191/67 |
| 5,954,171 | A | * | 9/1999 | Gramatke et al. | 191/60.3 |

(Continued)

FOREIGN PATENT DOCUMENTS

| DE | 32 44 945 C1 | 1/1984 |
| DE | 102 56 705 A1 | 7/2004 |
| DE | 102010053528 A1 | 5/2012 |

OTHER PUBLICATIONS

Siemens AG, "Electrified Logistics", focus como Magazin, vol. 8, May 2012, pp. 28-33.

*Primary Examiner* — Jason C Smith
(74) *Attorney, Agent, or Firm* — Laurence Greenberg; Werner Stemer; Ralph Locher

(57) ABSTRACT

A non-track-bound vehicle operates on a route electrified by an overhead contact system. The vehicle has a current collector for energy transfer between the vehicle and an overhead cable. It has a lowering mechanism for the transfer of the current collector from an upright operational position in which the current collector is in sliding contact with the contact wires into a lowered neutral position in which the current collector is arranged within a vehicle clearance profile. An actuating element is provided for the simultaneous activation of the lowering mechanism and an additional vehicle device. The activation of the actuating element is intended in a driving situation requiring the lowering of the current collector. The operation of non-track-bound vehicles is safer even in critical driving situations, such as for example, maneuvers to avoid or overtake other vehicles at high speed.

6 Claims, 1 Drawing Sheet

(56) References Cited

U.S. PATENT DOCUMENTS

| | | | |
|---|---|---|---|
| 6,557,476 B2* | 5/2003 | Batisse | 104/289 |
| 8,324,858 B2* | 12/2012 | Hill et al. | 320/109 |
| 2006/0267748 A1* | 11/2006 | Knoop et al. | 340/435 |
| 2010/0270983 A1* | 10/2010 | Gong et al. | 320/167 |
| 2013/0126251 A1* | 5/2013 | Ruth | 180/2.1 |
| 2013/0140121 A1* | 6/2013 | Huber et al. | 191/59.1 |
| 2013/0245876 A1* | 9/2013 | Messerschmidt | 701/22 |
| 2014/0041951 A1* | 2/2014 | Tojima et al. | 180/2.1 |
| 2014/0097054 A1* | 4/2014 | Francke et al. | 191/59.1 |
| 2014/0110205 A1* | 4/2014 | Dronnik | 191/59.1 |
| 2014/0138200 A1* | 5/2014 | Dronnik et al. | 191/59.1 |
| 2014/0224609 A1* | 8/2014 | Saito et al. | 191/59.1 |
| 2015/0034441 A1* | 2/2015 | Nakajima et al. | 191/59.1 |
| 2015/0165911 A1* | 6/2015 | Gerstenberg et al. | 191/59.1 |

* cited by examiner

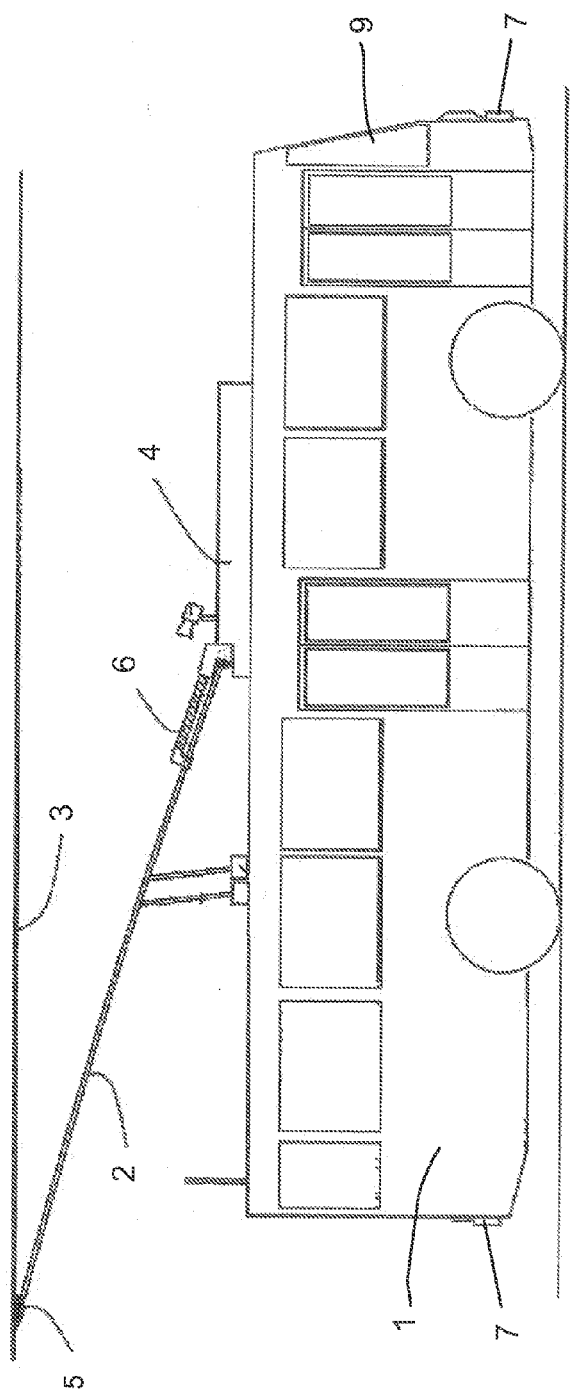
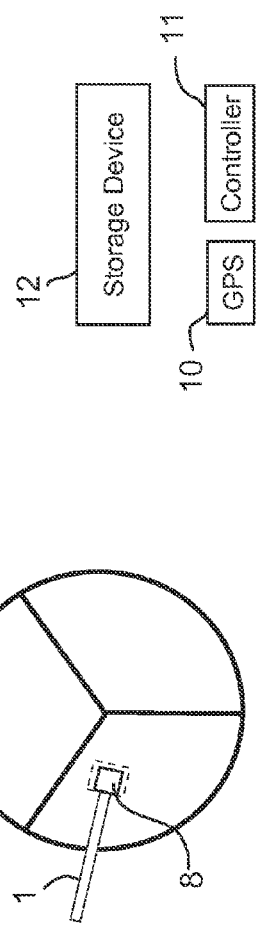
FIG. 1
FIG. 2

NON-TRACK-BOUND VEHICLE

CROSS-REFERENCE TO RELATED APPLICATION

This application claims the priority, under 35 U.S.C. §119, of German application DE 10 2012 217 773.6, filed Sep. 28, 2012; the prior application is herewith incorporated by reference in its entirety.

BACKGROUND OF THE INVENTION

Field of the Invention

The invention relates to a non-track-bound vehicle for operation on a route electrified by an overhead contact system, in particular in a lane of a multi-lane carriageway.

A two-pole overhead contact system for electrically powered local public transport vehicles, so-called trolleybuses, is known from the German patent DE 32 44 945 C1. A trolleybus is equipped with a pair of pantographs which in operation assume a position opposed to the horizontal, in which their rest skids duly lie flat on the two catenary wires. The trolley poles are subject to the force of an uprighting spring which ensures the necessary pressure of the rest skids on the catenary wires. The pantographs are hinged around a horizontal axis diagonal to the direction of travel on the roof of the trolleybus so that they can be lowered and raised again. To compensate for lateral deviations relative to the course of the catenary wires, the pantographs can also be rotated around a vertical axis in order to be able to maintain sliding contact with the catenary wires.

Published, non-prosecuted German patent application DE 102 56 705 A1 discloses a non-track-bound vehicle, as it is used as a truck in open cast mining. The electric motor of the vehicle is supplied by two pantographs which are in contact with the contact wires of a two-pole overhead cable via contact strips during operation. In order that the vehicle is only ever steered in such a way as to avoid the contact strips leaving the contact wires, sensor strips are arranged on the pantographs by which the relative position of the pantographs to the contact wires is determined. The driver of the vehicle can be notified of this information by a display device so as to be able to carry out appropriate steering maneuvers at once. It is also possible to supply the information from the sensors to a control unit for automatic steering of the vehicle.

Both trolleybuses and open cast mining vehicles are intended for city-center or in-plant driving at low speeds, at which changing traffic lanes to pass other vehicles does not normally occur. Furthermore, the overhead contact systems have no breaks that would necessitate a lowering of the current collector while driving.

When traction power is fed into a vehicle from an overhead contact system which has a discontinuous course, the current collector must be completely separated from the overhead cable at contact wire breaks. Added to this in the case of a non-track-bound vehicle is the fact that it is also necessary to separate the current collector from the overhead cable when leaving the electrified traffic lane sideways. To separate the current collector from the overhead cable, the driver must activate a lowering mechanism even if he is in a critical driving situation, for instance when entering a tunnel or during a maneuver to avoid or pass another vehicle involving a change of traffic lane.

SUMMARY OF THE INVENTION

The object of the invention is therefore to provide a non-track-bound vehicle which can also be safely operated in critical driving situations, such as for example maneuvers to avoid or pass another vehicle at high speed.

With the foregoing and other objects in view there is provided, in accordance with the invention a non-track-bound vehicle for operation on a route electrified by an overhead contact system. The non-track-bound vehicle contains a current collector for energy transfer between the non-track-bound vehicle and an overhead cable and a lowering mechanism for transferring the current collector from an upright operational position in which the current collector is in sliding contact with contact wires of the overhead contact system into a lowered neutral position in which the current collector is disposed within a given vehicle clearance profile of the non-track-bound vehicle. The non-track-bound vehicle further has a driver cab, an additional vehicle device, and an actuating element for simultaneous activation of the lowering mechanism and the additional vehicle device. The activation is envisaged in a driving situation requiring a lowering of the current collector. The actuating element is disposed in the driver cab.

In accordance with an added feature of the invention, the additional vehicle device is provided for activation in an event of a change of a traffic lane.

In accordance with another feature of the invention, the additional vehicle device is a direction indicator.

In accordance with an additional feature of the invention, the non-track-bound vehicle further has a storage device for positions of contact wire breaks, a device for determining a current vehicle position, and a control device for an automatic activation of the lowering mechanism. The lowering mechanism is connected to the control device. The control device is connected to the device for determining the current vehicle position and to the storage device, wherein the control device triggers the lowering mechanism on reaching a given threshold value for a distance between the current vehicle position and a break position.

In accordance with a concomitant feature of the invention, the non-track-bound vehicle operates in a traffic lane of a multi-lane carriageway.

Other features which are considered as characteristic for the invention are set forth in the appended claims.

Although the invention is described herein as embodied in a non-track-bound vehicle, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

BRIEF DESCRIPTION OF THE SEVERAL VIEWS OF THE DRAWING

FIG. 1 is a diagrammatic, side view of a bus according to the invention; and

FIG. 2 is an illustration of a steering wheel and control panel of the bus.

DETAILED DESCRIPTION OF THE INVENTION

The invention relates to a non-track-bound vehicle 1 for operation on a route electrified by an overhead contact system, in particular in a traffic lane of a multi-lane carriageway (see FIG. 1). The vehicle 1 has a current collector 2 for energy transfer between the vehicle 1 and an overhead cable 3. In this connection traction power can be fed into the vehicle 1 as well as braking energy fed back into the overhead cable 3. Furthermore, the vehicle 1 has a lowering mechanism 4, 6 to transfer the current collector 2 from an upright operational position into a lowered neutral position, which can be constituted mechanically by a coil spring or pneumatically by a cylinder 6 or a pneumatic muscle. In an operational position the current collector 2 is in sliding contact with contact wires 3 of the overhead contact system via contact strips 5. In a neutral position the current collector 2 is arranged within a given vehicle clearance profile of the vehicle. In the driver's cab 9 there is an actuating element 8 for the simultaneous activation of the lowering mechanism 4, 6 and an additional vehicle device 7 (see FIG. 2), the activation of which is envisaged in a driving situation requiring the lowering of a current collector 2. This is to prevent the driver from having to activate an additional separate operating device in a critical driving situation which requires the lowering of the current collector 2. In principle, conventional control devices which are usually present in vehicles operated exclusively with combustion engines serve as actuating devices of additional vehicle devices. These include, for example, the brake pedal, the accelerator, the direction indicator 7 or the steering wheel. By means of appropriate selection of these control devices and their combination with potentially critical driving situations, such as for example overtaking, additional actions by the driver may become superfluous, representing additional safety. The advantage of this is that the additional function of lowering a current collector 2 appears transparent for the driver and no additional actions are required in critical driving situations and that the solution therefore represents additional safety. Thus, a non-track-bound vehicle 1 can leave its traffic lane, for example in order to overtake another vehicle or to leave the route in general in which it is using the overhead cable, as the current collector 2 can be completely separated from the contact wires 3 in good time before loss of contact. In the case of a laterally adjustable current collector for contact retention in the case of steering inaccuracies, this may protrude laterally from the normal contour outline of the vehicle in the direction of the overhead cable being left in the case of highly off-centered driving. If the current collector 2 is lowered into its neutral position, then for example when overtaking other vehicles a collision of the current collector with the vehicle to be overtaken—for instance with high superstructures as in the case of heavy goods vehicles or with their current collector—can be avoided as the vehicle has a defined vehicle clearance profile, hence a defined width and height, in the neutral position of the current collector.

In an advantageous embodiment of the vehicle according to the invention the additional vehicle device 7 is provided for activation when changing traffic lanes. The additional vehicle device may particularly advantageously be a direction indicator 7. The setting of the switch 8 (e.g. the actuating element 8) for the direction indicator is therefore used to lower the current collector at the same time. The activation of the switch 8 is readable by electronic devices via the in-vehicle data bus. The direction indicator 7 is usually used to indicate an intended change of traffic lane. In this case, the lowering of the current collector 2 is initiated at the same time so that at the time of passing the vehicle to be overtaken it is already in a secure position on the vehicle.

In a preferred embodiment of the vehicle according to the invention the lowering mechanism 4, 6 is connected to a control device 11 for the automatic activation of the lowering mechanism 4, 6. The control device 11 is in turn connected to a device for the determination of the current vehicle position, for example, a GPS receiver 10, and to a storage device 12 for positions of contact wire breaks. The control device 11 is configured to trigger the lowering mechanism 4, 6 on reaching a given threshold value for the distance between vehicle position and break position. At known locations of overhead cable breaks, for example at underpasses with lowered ceiling height, the lowering procedure can be automated on the basis of the automatically acquired positioning information. As a result of this automated activation, the attention of the driver can be focused on the traffic, which in turn increases operational safety.

The basis of the invention is to embed the additional activation function of current collector lowering compared with conventional heavy goods vehicles into conventional operating actions, such as for example, activating the gas or brake pedal, direction indicator or also the steering wheel. The advantage of this is that the driver does not have to take any additional actions that divert his attention from monitoring the traffic in order to lower the current collector in critical driving situations.

The invention claimed is:

1. A non-track-bound vehicle for operation on a route electrified by an overhead contact system, the non-track-bound vehicle comprising:
   a current collector for energy transfer between the non-track-bound vehicle and an overhead cable;
   a lowering mechanism for transferring said current collector from an upright operational position in which said current collector is in sliding contact with contact wires of the overhead contact system into a lowered neutral position in which said current collector is disposed within a given vehicle clearance profile of the non-track-bound vehicle;
   a driver cab;
   an additional vehicle device; and
   an actuating element for simultaneous activation of said lowering mechanism, causing a lowering of said current collector, and said additional vehicle device causing an operation for which said additional vehicle device was designed to accomplish to be performed, the activation being envisaged in a driving situation requiring a lowering of said current collector, said actuating element disposed in said driver cab.

2. The vehicle according to claim 1, wherein said additional vehicle device is provided for activation in an event of a change of a traffic lane.

3. The vehicle according to claim 1, wherein said additional vehicle device is a direction indicator.

4. The vehicle according to claim 1, further comprising:
   a storage device for positions of contact wire breaks;
   a device for determining a current vehicle position; and
   a control device for an automatic activation of said lowering mechanism, said lowering mechanism is connected to said control device, said control device is connected to said device for determining the current vehicle position and to said storage device, wherein said control device triggers said lowering mechanism on reaching a given threshold value for a distance between the current vehicle position and a break position.

5. The vehicle according to claim 1, wherein the non-track-bound vehicle operates in a traffic lane of a multi-lane carriageway.

6. The vehicle according to claim 1, wherein said additional vehicle device is selected from the group consisting of a directional indicator, a steering wheel, a brake pedal, and an accelerator pedal.

* * * * *